United States Patent
Cheng et al.

(10) Patent No.: US 9,148,323 B2
(45) Date of Patent: Sep. 29, 2015

(54) TRANSMITTER

(71) Applicant: Agency for Science, Technology and Research, Singapore (SG)

(72) Inventors: San Jeow Cheng, Singapore (SG); Yuan Gao, Singapore (SG); Chun Huat Heng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 94 days.

(21) Appl. No.: 14/022,136

(22) Filed: Sep. 9, 2013

(65) Prior Publication Data

US 2014/0072077 A1 Mar. 13, 2014

(30) Foreign Application Priority Data

Sep. 7, 2012 (SG) .............................. 201206656-9

(51) Int. Cl.
*H04L 27/12* (2006.01)
*H04L 27/20* (2006.01)

(52) U.S. Cl.
CPC ................ *H04L 27/12* (2013.01); *H04L 27/20* (2013.01)

(58) Field of Classification Search
CPC ..... H04L 27/12; H04L 27/361; H04L 27/362; H04L 27/0008; H04L 2027/0018
USPC ............................ 375/303, 302, 149; 332/103
See application file for complete search history.

(56) References Cited

U.S. PATENT DOCUMENTS 5,832,027 A * 11/1998 Ishigaki .......................... 375/149

| | | | |
|---|---|---|---|
| 2005/0220218 A1* | 10/2005 | Jensen et al. | 375/302 |
| 2007/0036237 A1* | 2/2007 | Kobayashi et al. | 375/269 |
| 2010/0102895 A1* | 4/2010 | Beukema et al. | 332/103 |

FOREIGN PATENT DOCUMENTS

| EP | 0 654 914 A2 | 5/1995 |
|---|---|---|
| WO | WO 2011/149425 A1 | 12/2011 |
| WO | WO 2012/173573 A1 | 12/2012 |

OTHER PUBLICATIONS

Shengxi Diao, et al., "A 50-Mb/s CMOS QPSK/O-QPSK Transmitter Employing injection Locking for Direct Modulation", IEEE Transactions on Microwave Theory and Techniques, vol. 60, No. 1, pp. 120-130. (Jan. 2012).

Pilsoon Choi, et al., "An Experimental Coin-Sized Radio for Extremely Low-Power WPAN (IEEE 802.15.4) Application at 2.4 GHz", IEEE Journal of Solid-State Circuits, vol. 38, No. 12, pp. 2258-2268, (Dec. 2003).

(Continued)

*Primary Examiner* — Daniel Washburn
*Assistant Examiner* — Fitwi Hailegiorgis
(74) *Attorney, Agent, or Firm* — Blakely, Sokoloff, Taylor & Zafman LLP

(57) ABSTRACT

According to embodiments of the present invention, a transmitter is provided. The transmitter includes a frequency shift keying (FSK) circuit, and a phase shift keying (PSK) circuit coupled in series to the FSK circuit, wherein the FSK circuit is configured, in a first mode of operation, to provide a FSK modulated signal to the PSK circuit, and, in a second mode of operation, to provide a fixed frequency signal to the PSK circuit, and wherein the PSK circuit is configured, in the first mode of operation, to transmit the FSK modulated signal, and, in the second mode of operation, to provide a PSK modulated signal based on the fixed frequency signal received from the FSK circuit.

19 Claims, 8 Drawing Sheets

(56) References Cited

OTHER PUBLICATIONS

Nico Boom, et al., "A 5.0mW 0dBm FSK Transmitter for 315/433 MHz ISM Applications in 0.25μm CMOS", IEEE Proceedings of the European Solid-State Circuits Conference (ESSCIRC), pp. 199-202. (Sep. 2004).

Yao-Hong Liu, et al., "A 2.7nJ/b Multi-Standard 2.3/2.4GHz Polar Transmitter for Wireless Sensor Networks", IEEE International Solid-State Circuits Conference, Digest of Technical Papers, pp. 448-450, (Feb. 22, 2012).

Rui Yu, et al., "A 5.5mA 2.4-GHz Two-Point Modulation Zigbee Transmitter with Modulation Gain Calibration", IEEE Proceedings of the Custom Integrated Circuits Conference (CICC), pp. 375-378, (Sep. 2009).

Jagdish Pandey, et al., "A Sub-100 μW MICS/ISM Band Transmitter Based on Injection-Locking and Frequency Multiplication", IEEE Journal of Solid-State Circuits, vol. 46, No. 5, pp. 1049-1058, (May 2011).

Yao-Hong Liu, et al., "A Wideband PLL-Based G/FSK Transmitter in 0.18 μm CMOS", IEEE Journal of Solid-State Circuits, vol. 44, No. 9, pp. 2452-2462, (Sep. 2009).

Jri Lee, et al., "A 20-Gb/s Burst-Mode Clock and Data Recovery Circuit Using Injection-Locking Technique": IEEE Journal of Solid-State Circuits, vol. 43, No. 3, pp. 619-630, (Mar. 2008).

Xueyi Yu, et al., "An FIR-Embedded Noise Filtering Method for ΔΣ Fractional-$N$PLL Clock Generators", IEEE Journal of Solid-State Circuits, vol. 44, No. 9, pp. 2426-2436. (Sep. 2009).

Dong-Woo Jee, et al., "A 0.1-$f_{ref}$ BW 1GHz Fractional-N PLL with FIR-Embedded Phase-Interpolator-Based Noise Filtering", IEEE International Solid-State Circuits Conference, Digest of Technical Papers, pp. 94-96, (Feb. 21, 2011.).

* cited by examiner

TRANSMITTER

CROSS-REFERENCE TO RELATED APPLICATION

This application claims the benefit of priority of Singapore patent application No. 201206656-9, filed 7 Sep. 2012, the content of it being hereby incorporated by reference in its entirety for all purposes.

TECHNICAL FIELD

Various embodiments relate to a transmitter.

BACKGROUND

Narrowband physical layer (PHY) specification for 802.15.6 requires both frequency and phase modulations. In this regard, a frequency shift keying (FSK) and phase shift keying (PSK) compatible transmitter (TX) is required in the Medical Implant Communication Service/Industrial Scientific Medical (MICS/ISM) band.

Current conventional mixer based architectures can support multiple modulations, but at the expense of high circuit complexity, high power consumption and large area, in other words they are often complex, power hungry and large. Phase-locked loop (PLL) based solutions (e.g. closed loop PLL-based solutions) have emerged as suitable candidates but have limited bandwidth (BW), thus limiting achievable data rate. Despite their limited bandwidth and their ability to only provide frequency modulation, bandwidth enhancement techniques like 2-point modulation (e.g. 2 point modulation open loop type) and baseband pulse shaping techniques to generate phase modulation equivalent spectrums have helped to overcome these shortfalls. The downside to these techniques is the added complexity to the system (e.g. hardware) and baseband, and emergence of new issues like modulation gain mismatches that need to be tackled. While 2 point modulation technique has no restriction on data rate, the system is complex and careful design is required to take care of modulation gain mismatch. Furthermore, it is difficult to achieve low power using the 2-point modulation technique.

One of the existing transmitters is the conventional mixer based transmitter. The mixer based architecture adopts a conventional direct I/Q (in-phase/quadrature) modulation with up-conversion mixers. It consists of a local oscillator (LO), which is usually a phase-locked loop (PLL) that generates I/Q outputs for frequency mixing. Digital-to-analog converters (DACs) are required to control the input data to the mixers, to enable phase/frequency modulation. Hence, this architecture can provide band-shaping and support universal modulation. Such architectures consume high power typically in the range of tens of mW. Issues like I/Q mismatch adds complexity to the already complicated architecture and this makes fractional-N PLL synthesizers, as described below, a more preferred choice for transmitters.

A fractional-N PLL transmitter or architecture, having a closed loop fractional-N PLL, can consume low power in the MICS/ISM bands less than 450 MHz. However, when used in these bands, a low frequency reference has to be utilized to minimize quantization noise for good phase noise performance. This PLL loop bandwidth, which is at least 10 times smaller than the frequency reference, would be severely limited. The loop bandwidth dictates how fast the loop can switch from one frequency to another. Hence, data rate would be restricted. A larger frequency reference can be used to boost data rate but it will be at the expense of phase noise due to the increase in quantization noise. Techniques to overcome bandwidth limitation like two-point modulation exist to improve the data rate but it incurs added system complexity due to the addition of a digital-to-analogue converter (DAC) to control the voltage controlled oscillator (VCO), and the proper calibration required to minimize gain mismatch. Moreover, PLLs can only perform frequency modulation and requires baseband processing methods to generate equivalent phase modulated spectrums e.g. Gaussian Minimum Shift Keying (G/MSK).

Another conventional transmitter has an injection locked ring oscillator (RO) with hybrid edge combiner/power amplifier (EC/PA) architecture, with an open loop injection locking. The transmitter uses crystal frequency pulling for frequency modulation and employs injection locking twice, serially to 2 ring oscillators (ROs). The signal is then multiplied up 9 times to its desired frequency via an edge combiner (EC) before transmission through a power amplifier (PA) driven antenna. Through the use of a hybrid EC/PA circuit and keeping the operation of its frequency generating circuit 9 times below the desired frequency, the power consumption is in the sub-100 µW range. However, the system is very rigid as the frequency generating circuit only produces 2 fixed frequencies. It does not allow phase equivalent modulation due to its inflexible frequency selection, and neither can the frequency deviation be controlled. As a result, a low data rate of 200 kb/s for the transmitter is reported.

A further conventional transmitter is an open loop PLL based transmitter, with open loop phase rotation. Typical open loop PLL requires temporary breaking of the loop for direct frequency modulation of the VCO. This will result in frequency drifting of the VCO. For the open loop PLL based transmitter, an integer-N PLL generates 4 equally spaced clock edges and through a $\Delta\Sigma$ modulator controlled phase rotator (PR), it is able to generate fractional delays by performing a dithered selection among the 4 clock phases. In this case, the data rate is not limited by the PLL bandwidth because the PLL is used as a fixed multi-phase reference and frequency switching is not required. While the achievable data rate is high, it suffers from large quantization noise due to $\pi/2$ separation of each clock phase, resulting in higher in-band noise. As a result, filtering prior to the antenna is required to improve phase noise of the output.

A yet further conventional transmitter is a two-point modulated fractional-N PLL transmitter. While closed loop fractional-N has bandwidth limitation, the two-point modulation technique can be employed to enable open loop modulation. The PLL frequency can be modulated directly with an additional digital-to-analogue converter (DAC) control which has to be balanced with the appropriate fractional division ratio. In this case, frequency switching is no longer limited by the PLL bandwidth. This two-point control system proved to be a potential replacement for the mixer based architecture and is widely adopted. Although it consumes less power than a mixer based architecture, it retains the complexity with issues that need to be tackled. The system is complicated due to the delicate control required to balance the modulation gain to minimize data errors. High data rate of typically >2 Mbps can be achieved.

While open loop systems have little restriction on data rate, they cannot support phase and frequency modulation schemes concurrently.

There is therefore need for a low power single architecture that may allow frequency and phase modulations with reasonably good phase noise.

SUMMARY

According to an embodiment, a transmitter is provided. The transmitter may include a frequency shift keying (FSK)

circuit, and a phase shift keying (PSK) circuit coupled in series to the FSK circuit, wherein the FSK circuit is configured, in a first mode of operation, to provide a FSK modulated signal to the PSK circuit, and, in a second mode of operation, to provide a fixed frequency signal to the PSK circuit, and wherein the PSK circuit is configured, in the first mode of operation, to transmit the FSK modulated signal, and, in the second mode of operation, to provide a PSK modulated signal based on the fixed frequency signal received from the FSK circuit.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
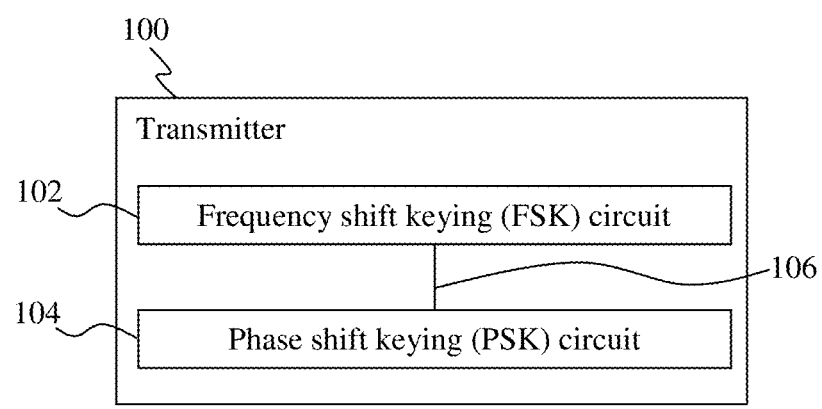
FIG. 1 shows a schematic block diagram of a transmitter, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element includes a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to circuit implementation of low-power, multichannel, FSK/PSK (Frequency/Phase Shift Keying) transmitters, for example for 802.15.6 Wireless Body Area Network (WBAN) applications. Various embodiments may provide an injection lock multi-channel WBAN transmitter.

Various embodiments may provide a dual injection-locking multi-channel reconfigurable frequency shift keying (FSK)/quadrature phase shift keying (QPSK) transmitter, for example a low power reconfigurable FSK/QPSK architecture based on dual injection-locking that may address some of the issues encountered by the existing transmitters.

Various embodiments of the transmitter may offer a low-power solution, narrowband with frequency selection, and phase and frequency modulation schemes featured in a single architecture. In addition, the transmitter may be easily reconfigured.

Various embodiments may provide a multi-channel injection locking based Wireless Body Area Network transmitter (WBAN TX). The transmitter may be a frequency shift keying/quadrature phase shift keying (FSK/QPSK) transmitter adapted to transmit one of a frequency shift keying (FSK) modulated signal or a phase shift keying (PSK) modulated signal. The transmitter may offer dual modulation (phase and frequency) schemes with a single architecture. The FSK/QPSK transmitter may be implemented using ΔΣ (delta-sigma) frequency modulation and dual injection-locking using two oscillators. The first oscillator may suppress high frequency noise via embedded finite impulse response (FIR) technique combined with injection-locking. For example, the first oscillator may be a FIR embedded relaxation oscillator. The second injection-locked oscillator may allow additional filtering and phase manipulation of signals.

Various embodiments may provide a low power dual injection-locking, multi-channel reconfigurable frequency shift keying and quadrature phase shift keying FSK/QPSK transmitter, for example targeted for the 802.15.6 wireless narrowband body area network (WBAN) applications. Two injection locked oscillators (ILOs) may be employed to facilitate the dual injection-locking approach. A digital ΔΣ (delta-sigma) modulator may be used to interpolate between clock phases to generate an output with different frequencies. The output may be raised 3 times to the desired frequency through sub-harmonic injection locking. Through dithering and injection locking, an output with a constant period may be generated. Frequency modulation with a data rate up to approximately 5 Mb/s may be achieved by toggling the δΣ modulator control word. By keeping frequency generation in a lower band, the transmitter architecture may consume less than about 2 mW when implemented using 65 nm CMOS technology. Further, as the output phase may be determined by the free running frequency of an injection-locked oscillator (ILO), phase modulation with symbol rate up to 10 Ms/s may be achieved by making the oscillator resonant frequency of at least one ILO programmable. As the quality of the ILO output may follow its injection reference or injection signal, a low-power injection-locked relaxation oscillator with embedded finite impulse response (FIR) filtering may be implemented to generate the injection signal, improving the output phase noise by about 5-10 dB at 1 MHz offset.

Various embodiments may offer low-complexity and cost effectiveness, low power and high-efficiency, and a "2-in-1" architecture (FSK/QPSK re-configurability).

Various embodiments may provide one or more of the following: (1) injection locking based solution, which may save power; (2) open loop modulation, which may achieve a higher data rate; (3) multi-channel capability with phase modulation scheme and frequency modulation scheme support; (4) additional injection lock to provide phase control to support more modulation schemes; or (5) more power saving and added filtering benefit from injection locking, as compared to conventional FIR.

FIG. 1 shows a schematic block diagram of a transmitter 100, according to various embodiments. The transmitter 100 includes a frequency shift keying (FSK) circuit 102, and a phase shift keying (PSK) circuit 104 coupled in series to the FSK circuit 102, wherein the FSK circuit 102 is configured, in a first mode of operation, to provide a FSK modulated signal to the PSK circuit 104, and, in a second mode of operation, to provide a fixed frequency signal to the PSK circuit 104, and wherein the PSK circuit 104 is configured, in the first mode of operation, to transmit the FSK modulated signal, and, in the second mode of operation, to provide a PSK modulated signal based on the fixed frequency signal received from the FSK circuit 102. The line represented as 106 is illustrated to show the relationship between the FSK circuit 102 and the PSK circuit 104, which may include electrical coupling and/or mechanical coupling.

In other words, the transmitter 100 may include a FSK circuit 102 that is configured for generation of a FSK modulated signal, and a PSK circuit 104 configured for generation of a PSK modulated signal. The FSK circuit 102 and the PSK circuit 104 may be coupled in series or cascade to each other. The PSK circuit 104 may be arranged downstream of the FSK circuit 102. The transmitter 100 may be configured to operate in a first mode of operation and in a second mode of operation.

In a first mode of operation, the FSK circuit 102 may be configured to provide a FSK modulated signal to the PSK circuit 104, which in turn may transmit the FSK modulated signal. Therefore, the first mode of operation may be a FSK mode of operation. The transmitter 100 may be configured as a FSK transmitter in the first mode of operation.

In various embodiments, the PSK circuit 104 may also process the FSK modulated signal prior to transmission, for example modifying a frequency of the FSK modulated signal, e.g. upscaling the frequency of FSK modulated signal.

In a second mode of operation, the FSK circuit 102 may be configured to provide a fixed frequency signal (i.e. a signal having a fixed frequency) to the PSK circuit 104, which in turn may provide or generate a PSK modulated signal based on the fixed frequency signal. Therefore, the second mode of operation may be a PSK mode of operation. The transmitter 100 may be configured as a PSK transmitter in the second mode of operation.

In the context of various embodiments, the term "frequency shift keying (FSK)" may mean a modulation method that conveys data or information via changes or modulation of a frequency of a reference signal or a carrier wave.

In the context of various embodiments, the term "phase shift keying (PSK)" may mean a modulation method that conveys data or information via changes or modulation of a phase of a reference signal or a carrier wave.

In the context of various embodiments, the PSK circuit 104 may be a quadrature phase shift keying (QPSK) circuit. The PSK modulated signal may be a quadrature phase shift keying (QPSK) modulated signal.

In various embodiments, in the first mode of operation, the PSK circuit 104 may be further configured to upscale a frequency of the FSK modulated signal. This may mean that after upscaling, the resulting signal may have a frequency that is higher than the frequency of the FSK modulated signal when received by the PSK circuit 104.

In various embodiments, the FSK circuit 102 may include an oscillator coupled to the PSK circuit 104, wherein the oscillator may be configured for injection-locking of a frequency of the FSK modulated signal or the fixed frequency signal to a frequency of an injection signal (e.g. $\phi_{inj}$) to be inputted into the oscillator.

In the context of various embodiments, the term "injection-locked" may mean that an oscillation stage of the oscillator locks to the frequency of an injected signal, such that the oscillator becomes an injection-locked oscillator (ILO). This may mean that the frequency of the output signal of an injection-locked oscillator may be at least substantially the same as the frequency of the signal injected as input to the injection-locked oscillator.

In various embodiments, the oscillator may be a relaxation oscillator, for example an injection locked relaxation oscillator (ILXO).

In various embodiments, the oscillator may be free of any inductors. In various embodiments, the oscillator may not be or may be free of an LC (inductor-capacitor) oscillator.

In various embodiments, the PSK circuit 104 may include another oscillator coupled in series to the oscillator to receive the FSK modulated signal or the fixed frequency signal, and to produce an output signal, wherein the other oscillator is configured for injection-locking of a frequency of the output signal to the frequency of FSK modulated signal or the fixed frequency signal.

In various embodiments, in the first mode of operation, the other oscillator may be configured to upscale the frequency of the FSK modulated signal to produce the output signal, and wherein, in the second mode of operation, the other oscillator may be configured to vary its resonant frequency in response to a control signal to produce the output signal, wherein the output signal has a phase determined based on the frequency of the fixed frequency signal and the resonant frequency of the other oscillator, the phase being selected from two possible phases spaced apart by 90°.

In various embodiments, the other oscillator may be an injection locked oscillator (ILO).

In various embodiments, the other oscillator may be an LC oscillator.

In the context of various embodiments, the other oscillator may include two capacitor bank arrangements which may give rise to two output phases that are 90° apart.

A respective capacitor bank arrangement of the two capacitor bank arrangements may be activated or switched to provide the output with the required output phase. In various embodiments, the two capacitor bank arrangements may be arranged in parallel to each other, wherein each capacitor bank arrangement may include a plurality of capacitors (e.g. two capacitors) arranged in series with each other. In addition, each capacitor bank arrangement may further include a switch.

In various embodiments, the two capacitor bank arrangements may be controlled by one or more control signals, e.g. D0 and D1, which may be based on QPSK "I" and "Q" data.

In various embodiments, in the first mode of operation, the other oscillator may be configured to produce the output signal based on a third harmonic of the frequency of the FSK modulated signal. For example, where the FSK modulated signal has a frequency of about 133.33 MHz, the resulting output signal may have a frequency of about 400 MHz.

In various embodiments, as the transmitter 100 may include two oscillators that may be injection-locked, dual injection-locking may be implemented in the transmitter 100.

In various embodiments, the FSK circuit 102 may further include a finite impulse response (FIR) filter configured to generate the injection signal, the injection signal having a frequency that depends on input signals to the FIR filter.

In various embodiments, the oscillator may be part of the FIR filter.

In various embodiments, the FIR filter may be an embedded FIR filter, for example an FIR filter embedded with the FSK circuit 102 or the transmitter 100.

In various embodiments, the transmitter 100 may further include a clock generator configured to generate a plurality of periodic waveforms delayed from each other by a predetermined interval, wherein the FIR filter is configured to select one or more periodic waveforms from the plurality of periodic waveforms to generate the injection signal.

In various embodiments, the injection signal may have a frequency that is at least substantially equal to an average frequency of the selected periodic waveforms.

In various embodiments, the predetermined interval may be at least substantially equal to a period of a sampling clock signal provided in the transmitter 100.

In various embodiments, the predetermined interval between two successive periodic waveforms may be $1/12$th of the period of the periodic waveforms.

In various embodiments, the clock generator may be coupled to the FIR filter.

In various embodiments, the FIR filter may select one periodic waveform during one sampling cycle. In order for a plurality of periodic waveforms to be selected, a plurality of sampling cycles are needed. For example, a periodic waveform may be selected during a sampling cycle, and another periodic waveform may be selected during another sampling cycle. Each sampling cycle may correspond to a period of the sampling clock signal.

In various embodiments, the sampling clock signal may include equally spaced apart clock edges. The duration between adjacent clock edges may represent the period of the sampling clock signal.

In various embodiments, the FSK circuit 102 may further include a frequency interpolation circuit configured to provide one or more select signals to the FIR filter for selecting the one or more periodic waveforms from the plurality of periodic waveforms.

In various embodiments, the frequency interpolation circuit may include a plurality of logic elements. A respective logic element of the plurality of logic elements may be employed for providing a respective select signal.

In various embodiments, the clock generator may include a delay circuit configured to generate the plurality of periodic waveforms based on a reference clock signal (e.g. $\phi_{ref}$). Each periodic waveform may have a frequency that is at least substantially equal to the frequency of the reference clock signal.

In various embodiments, the delay circuit may include a plurality of delay logic elements or cells. The number of delay logic elements or cells may depend on the number of periodic waveforms to be generated.

In various embodiments, the clock generator may further include a crystal oscillator configured to provide the reference clock signal.

In various embodiments, the FSK circuit 102 may further include a sampling circuit configured to provide an input signal to the frequency interpolation circuit, the sampling circuit adapted to receive a data signal (or control word), wherein the frequency interpolation circuit may be configured to provide the one or more select signals to the FIR filter based on the input signal, wherein, in the first mode of operation, the data signal is varied, and wherein the sampling circuit may be configured to be controlled by the varied data signal to control the frequency interpolation circuit to provide the one or more select signals to the FIR filter to select the one or more periodic waveforms during respective sampling cycles, for the FSK circuit 102 to produce the FSK modulated signal, and wherein, in the second mode of operation, the data signal is fixed, and wherein the sampling circuit is configured to be controlled by the fixed data signal to control the frequency interpolation circuit to provide the one or more select signals to the FIR filter to select the one or more periodic waveforms during respective sampling cycles, for the FSK circuit to produce the fixed frequency signal.

In various embodiments, in the first mode of operation and the second mode of operation, the sampling circuit may be configured to be controlled by the data signal to have the FIR filter select two periodic waveforms.

In various embodiments, the sampling circuit may include a $\Delta\Sigma$ (delta-sigma) modulator (e.g. a digital $\Delta\Sigma$ modulator).

In various embodiments, the FIR filter may include a register arrangement configured to receive the one or more select signals, and a plurality of multiplexers (MUX) coupled to the register arrangement, wherein a respective multiplexer of the plurality of multiplexers is configured to receive a respective periodic waveform of the plurality of periodic waveforms, and wherein the register arrangement is configured to select (or activate) one or more multiplexers of the plurality of multiplexers in response to the one or more select signals to select the one or more periodic waveforms for generating the injection signal. The plurality of multiplexers may be arranged in parallel to each other.

In various embodiments, the register arrangement be a shift register chain, and may include a plurality of logic elements (e.g. registers), where a respective logic element may be coupled to a respective multiplexer. The plurality of logic elements or registers may be arranged or coupled in series. In various embodiments, a respective logic element may receive a respective select signal and select the corresponding respective multiplexer in response to the received select signal so as to select or transmit the periodic waveform received by the corresponding respective multiplexer. In various embodiments, the number of logic elements may be equal to the number of multiplexers. In various embodiments, there may be 12 multiplexers, for receiving 12 periodic waveforms respectively.

In various embodiments, the PSK circuit 104 may further include a phase swap circuit (or polarity swap circuit) configured to receive the output signal produced by the other oscillator, wherein, in the first mode of operation, the phase swap circuit may be configured to transmit the output signal, and wherein, in the second mode of operation, the phase swap circuit may be configured to produce one output signal out of two possible output signals, wherein an output signal of the two possible output signals has a phase that is the same as a phase of the output signal produced by the other oscillator, and wherein another output signal of the two possible output signals has a phase that is inverted to a phase of the output signal produced by the other oscillator.

In various embodiments, the phase swap circuit may be controlled by one or more control signals, e.g. D0 and D1, which may be based on QPSK "I" and "Q" data.

In various embodiments, the transmitter 100 may further include an amplifier configured, in the first mode of operation, to amplify the FSK modulated signal prior to transmission by the transmitter 100, and, in the second mode of operation, to amplify the PSK modulated signal prior to transmission by the transmitter 100. The amplifier may be a power amplifier (PA).

In various embodiments, the transmitter 100 may further include an antenna for transmission of the FSK modulated signal in the first mode of operation, and the PSK modulated signal in the second mode of operation.

In the context of various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a 'circuit' in accordance with an alternative embodiment.

In the context of various embodiments, the terms "couple" and "coupled" may include electrical coupling and/or mechanical coupling.

In the context of various embodiments, the terms "couple" and "coupled" with regard to two or more components may include direct coupling and/or indirect coupling. For example, two components being coupled to each other may mean that there is a direct coupling path between the two components and/or there is an indirect coupling path between the two components, e.g. via one or more intervening components connected therebetween.

Figure 2:
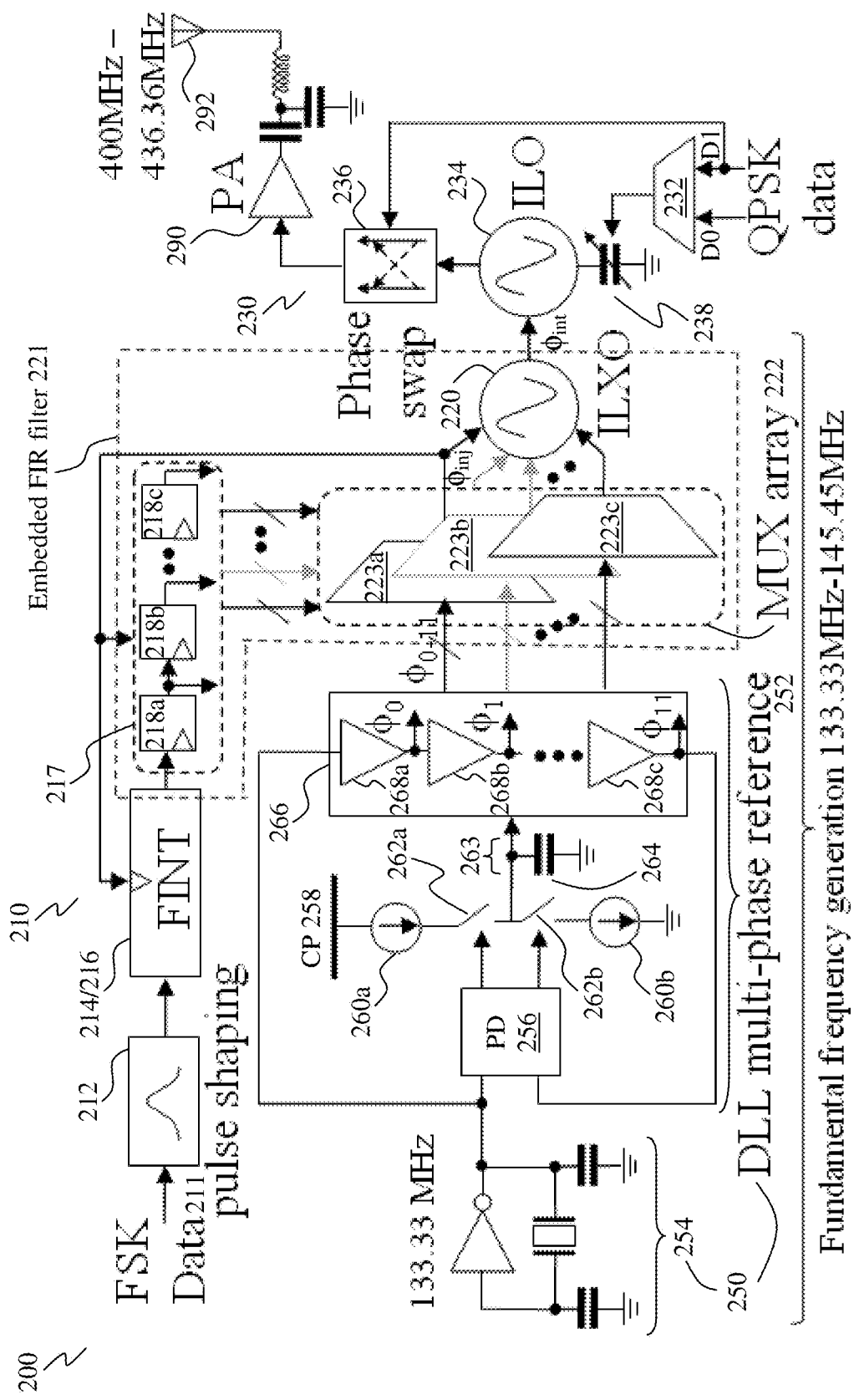
FIG. 2 shows a schematic view of a transmitter, according to various embodiments.

FIG. 2 shows a schematic view of a transmitter 200, according to various embodiments, which is dual injection locking based. The transmitter 200 may include a frequency shift keying (FSK) circuit 210 which may be employed for generation of a FSK modulated signal, and a phase shift keying (PSK) circuit 230 which may be employed for generation of a PSK modulated signal. The FSK circuit 210 and the PSK circuit 230 may be arranged in series with each other such that an intermediate signal, $\phi_{int}$, may propagate between the FSK circuit 210 and the PSK circuit 230, for example from the FSK circuit 210 to the PSK circuit 230. The FSK circuit 210 may form part of a first stage of the transmitter 200 while the PSK circuit 230 may form part of a second stage of the transmitter 200. The transmitter 200 may be operable in a first mode of operation to produce and transmit a FSK modulated signal, and in a second mode of operation to produce and transmit a PSK modulated signal. Therefore, depending on the mode of operation, the transmitter 200 may be configured to operate as a FSK transmitter (first mode of operation) and a PSK transmitter (second mode of operation). In the first mode of operation, the intermediate signal, $\phi_{int}$, may be a FSK modulated signal, while in the second mode of operation, the intermediate signal, $\phi_{int}$, may be a fixed frequency signal.

The FSK circuit 210 may include a pulse shaping circuit 212, a delta-sigma modulator ($\Delta\Sigma M$) 214, a frequency interpolation circuit 216 which may be controlled by the $\Delta\Sigma M$ 214 (the delta-sigma modulator ($\Delta\Sigma M$) 214 and the frequency interpolation circuit 216 are collectively shown as a single block labelled "FINT", which means frequency interpolator), a shift register chain 217, a multiplexer (MUX) array 222 and an oscillator 220. The shift register chain 217 may receive one or more signals from the delta-sigma modulator ($\Delta\Sigma M$) 214 and/or the frequency interpolation circuit 216. The shift register chain 217, the MUX array 222 and the oscillator 220 may form an embedded hybrid filter or embedded finite impulse response (FIR) filter 221. The oscillator 220 may be an injection-locked relaxation oscillator (ILXO), free of any inductors.

The $\Delta\Sigma M$ 214 may form part of a sampling circuit. The $\Delta\Sigma M$ 214 may include a quantizer to receive, for example, a sequence of bits. The $\Delta\Sigma M$ 214 may receive an input waveform (e.g. an injection signal), $\phi_{inj}$, as will be described later, and a data signal or control word, K (not shown). The $\Delta\Sigma M$ 214 may also receive FSK data 211, which may be shaped by the pulse shaping circuit 212 prior to the $\Delta\Sigma M$ 214. The frequency interpolation circuit 216 may receive the output of the $\Delta\Sigma M$ 214 as an input signal and may, for example, output a select signal, for example one of $SEL_0$ to $SEL_{11}$, for selecting a clock phase out of a plurality of clock phases (or periodic waveforms). In this way, the $\Delta\Sigma M$ 214 may control the frequency interpolation circuit 216, for example, for outputting a select signal for selecting a clock phase or periodic waveform. The select signals, $SEL_0$ to $SEL_{11}$, may be provided to the shift register chain 217. In this way, the frequency interpolation circuit 216 may also be seen as functioning to select a clock phase or periodic waveform.

As a non-limiting example, the register arrangement or shift register chain 217 may include 12 logic elements (or registers) which may be activated by the select signal provided by the frequency interpolation circuit 216. The logic elements or registers may provide a unit delay equal to the clock period of $\phi_{inj}$. As a non-limiting example, the shift register chain 217 may include a first logic element 218a, a second logic element 218b, up to a 12th logic element 218c. The MUX array 222 may include 12 multiplexers, for example, a first multiplexer (MUX) 223a, a second MUX 223b, up to a 12th MUX 223c, where a respective MUX may be coupled to a respective logic element of the shift register chain 217. As an example, the first MUX 223a may be enabled by the first logic element 218a, in turn activated by the first select signal, $SEL_0$, for selecting a first clock phase or periodic waveform.

The oscillator 220 may receive the injection signal, $\phi_{inj}$, and may be used for injection locking onto the frequency interpolated signal or the injection signal $\phi_{inj}$ generated via clock period averaging. The generation of the injection signal, $\phi_{inj}$, will be described later. The oscillator 220 may output an intermediate signal, $\phi_{int}$, as an output, to the PSK circuit 230. The injection signal, $\phi_{inj}$, may be provided to the shift register chain 217.

The transmitter 200 may also include a clock generator 250. The clock generator 250 may include a delay-locked loop (DLL) 252, may be utilized as a multi-phase reference generator, and a crystal oscillator 254 coupled to each other. The crystal oscillator 254 may provide a reference clock signal, $\phi_{ref}$, for example having a frequency of about 133.33 MHz, as an input to the DLL 252. The DLL 252 may include a phase detector (PD) 256, a charge pump (CP) 258 having two current sources, e.g. a first current source 260a and a second current source 260b, and a first switch 262a and a second switch 262b which may be toggled, a loop filter (LF) 263 defined by a capacitor 264 and a delay circuit (e.g. a voltage controlled delay line (VCDL)) 266. The phase detector (PD) 256 may receive $\phi_{ref}$ and an output signal of the delay circuit 266 as inputs. The delay circuit 266 may receive $\phi_{ref}$ as an input. An output signal from the loop filter 263 may also be inputted to the delay circuit 266.

The phase detector (PD) 256, the charge pump (CP) 258 and the loop filter (LF) 263 may combine functionally to form a feedback control loop such that the eventual loop filter voltage of the loop filter (LF) 263 may settle or stabilise and may result in the total delay of the delay circuit 266 to be at least substantially equal to or close to or approaching to one clock period of the reference clock, $\phi_{ref}$, of the crystal oscillator 254.

The delay circuit 266 may, for example, include a plurality of delay cells to generate a plurality of clock phases (or periodic waveforms) of the reference clock, $\phi_{ref}$, where the plurality of clock phases may be different relative each other by their respective phases. For example, the plurality of periodic waveforms may be delayed from each other by a predetermined interval. As a non-limiting example, there may be 12 delay cells for generating 12 periodic waveforms, for example a first delay cell 268a for outputting a first periodic waveform $\phi_0$, a second delay cell 268b for outputting a second periodic waveform $\phi_2$, up to a 12th delay cell 268c for outputting a 12th periodic waveform $\phi_{11}$. The periodic waveforms, $\phi_{0-11}$, may be provided to the MUX array 222.

As a non-limiting example, the first logic element 218a may be activated by the first select signal $SEL_0$, to enable the first MUX 223a for selecting or passing through the first periodic waveform $\phi_0$, the second logic element 218b may be activated by the second select signal $SEL_1$, to enable the second MUX 223b for selecting or passing through the second periodic waveform $\phi_1$, and so on.

In various embodiments, the PSK circuit 230 may include a logic element 232, for example an "Exclusive OR" (XOR) gate, which may receive QPSK data, D0 and D1, so as to provide an output signal to a variable capacitor 238, another oscillator 234 coupled to the variable capacitor 238, and a phase swap circuit 236 coupled to the ILO 234. The oscillator 234 may be an injection-locked oscillator (ILO), e.g. an LC (inductor-capacitor) oscillator. The variable capacitor 238 may be used for tuning the oscillation frequency of the oscillator 234.

The transmitter 200 may also include a power amplifier (PA) 290 for amplification of the FSK modulated signal or the PSK modulated signal prior to transmission. The transmitter 200 further includes an antenna 292 for transmission of the FSK modulated signal or the PSK modulated signal.

While not shown in FIG. 2, one or more buffers (e.g. memory) may be provided in the transmitter 200. For example, respective buffers may be arranged at at least one of the output of the ILXO 220, the output of the ILO 234, the output of the phase swap circuit 236 or the output of the PA 290.

In various embodiments, the intermediate signal, $\phi_{int}$, may have a frequency of between about 133.33 MHz and about 145.45 MHz. $\phi_{int}$ may be injection locked into the ILO 234 via its third harmonic, thereby causing the free running ILO 234 to lock to 3 times the frequency of $\phi_{int}$, generating an oscillator output signal having frequencies ranging from about 400 MHz to about 436.36 MHz. Sub-harmonic (3rd) injection-locking of the average output frequency of $\phi_{in}$ triples the frequency at the output of the ILO 234.

The transmitter of various embodiments may provide injection locking solutions that are simple and low in power, as compared to conventional mixer-based solutions which are complex and power consuming.

The transmitter of various embodiments may include open loop frequency modulation using $\Delta\Sigma$ modulator based frequency interpolator or interpolation circuit, as compared to conventional closed loop PLL based solutions which have limited bandwidth (BW), which severely limits data rate.

In various embodiments, as injection lock may allow phase modulation, such an approach may be combined with $\Delta\Sigma$ modulator based frequency interpolation to allow direct modulation. This offers a simple approach as compared to conventional 2 point modulation PLLs which are complex.

As the modulated output may be dithered, and therefore not suitable for use as QPSK reference, the transmitter of various embodiments may use injection locking to reduce dithering in the frequency generation stage.

The use of dual injection locking requires 2 pairs of external inductors, which are costly. However, in various embodiments of the transmitter, the first injection-locked oscillator (ILO) may be replaced with a relaxation oscillator with embedded FIR filter for effective filtering.

Figure 3A:
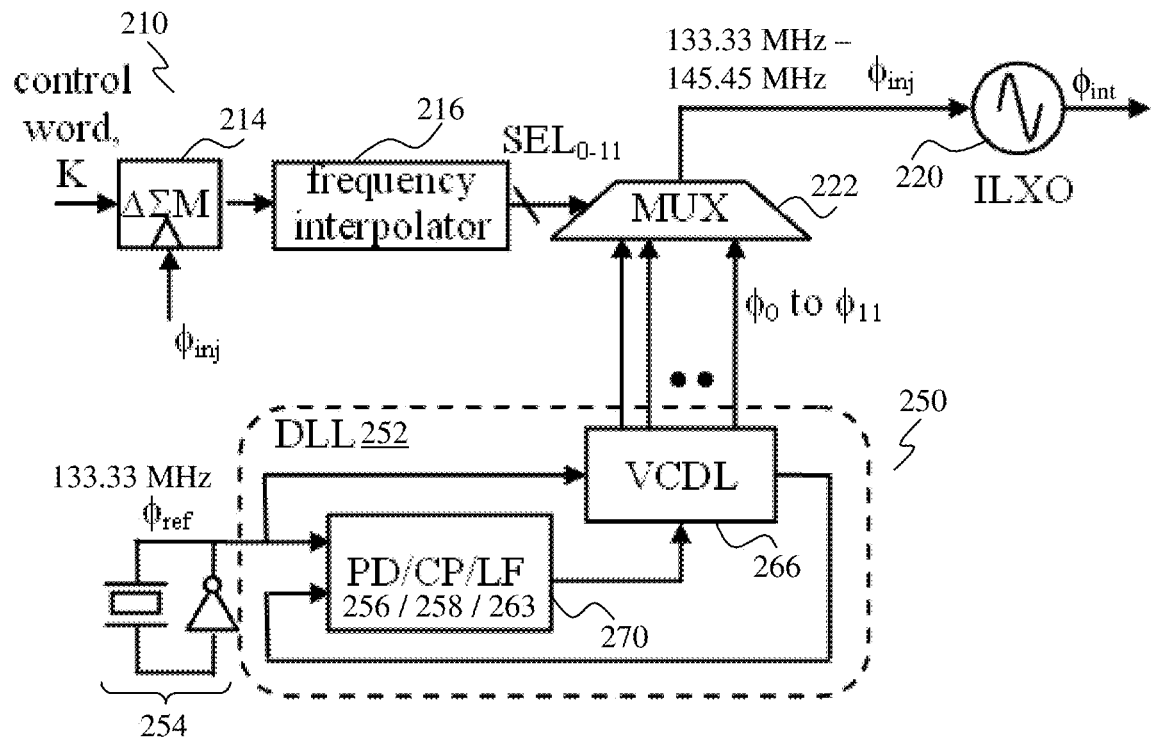
FIG. 3A shows a schematic view of a frequency shift keying (FSK) circuit and a clock generator, according to various embodiments.

The operation of the FSK circuit 210 will now be described by way of the following non-limiting example, with reference to FIGS. 3A to 3C. FIG. 3A shows a schematic view of a frequency shift keying (FSK) circuit 210 and a clock generator 250, according to various embodiments, which may be employed in the transmitter 200 of FIG. 2. For simplicity and clarity, the phase detector (PD) 256, the charge pump (CP) 258 and the loop filter (LF) 263 are collectively shown as a block 270, and the MUX array 222 is represented by a single multiplexer. In addition, some elements described in the context of transmitter 200 may not be shown in FIG. 3A but nevertheless may be present.

In the initial startup of the clock generator 250, the total delay in the delay circuit (e.g. a voltage controlled delay line (VCDL)) 266 of the DLL 252 may lock to exactly 1 (one) clock period (e.g. 133.33 MHz) of the reference clock signal, $\phi_{ref}$ of the crystal oscillator 254. Once locked, the DLL 252 may produce or generate 12 evenly or similarly spaced clock phases or periodic waveforms, $\phi_0$-$\phi_{11}$, each having a reference frequency, $f_{ref}$, of about 133.33 MHz, similar to the frequency of $\phi_{ref}$. The 12 clock phases ($\phi_0$-$\phi_{11}$) may be provided to the MUX array 222.

The delta-sigma modulator ($\Delta\Sigma M$)-controlled frequency interpolation circuit 216 may select one periodic waveform during each sampling cycle to provide a period related to the output of the $\Delta\Sigma M$ 214. After a certain number of sampling cycles, the dithering phase selection sequence generated by the $\Delta\Sigma M$ 214 may produce an output waveform, $\phi_j$, with an average clock period that is a fraction between $^{11}/_{12} T_{clk}$ and $T_{clk}$, where $T_{clk}=1/133.33$ MHz ($T_{clk}=1/f_{ref}$). On average, the dithering phase selection sequence may produce an output waveform, $\phi_{inj}$, with an average clock period that is related to the input or control input, K, of the $\Delta\Sigma M$ 214.

As the $\Delta\Sigma M$ 214 may produce an average output that matches its input, $\phi_{inj}$, each different control word, K, may result in the output having a unique fractional clock period or frequency. For example, $\phi_{inj}$ may have a frequency of between about 133.33 MHz and about 145.45 MHz. $\phi_{inj}$ may then be injection locked to the ILXO 220. The ILXO 220 may then generate an output signal, $\phi_{int}$. The signal $\phi_{int}$ may be injection-locked to the ILO 234 and pass through the PSK circuit 230, amplified by the PA 290 which then drives the antenna 292 to achieve FSK modulation.

In various embodiments, $\phi_{inj}$ is used for injection locking for the ILXO 220 as well as being a clock signal to drive the ΔΣM 214. In other words, the same signal $\phi_{inj}$ is used for the ΔΣM 214 and the ILXO 220.

In various embodiments, the ΔΣM-controlled frequency interpolation circuit 216 may be used to interpolate between two clock periods. Through averaging, frequencies ranging from about 133.33 MHz to about 145.45 MHz may be generated with very fine resolution. The frequency may be tuned by changing the digital control word, K. Thus, narrowband tuning may be achieved.

Figure 3B:
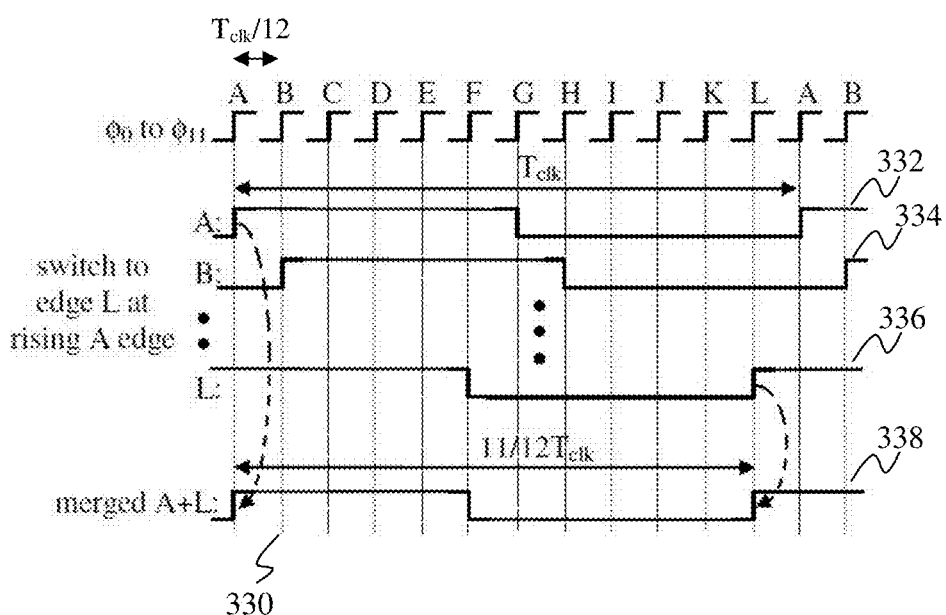
FIGS. 3B and 3C show the operations of a frequency interpolation circuit, according to various embodiments.

FIG. 3B shows an operation of a frequency interpolation circuit (e.g. 216, FIG. 3A), according to various embodiments, which enables quantification of the frequency control. At every sampling cycle of the ΔΣM (e.g. 214), a clock phase (or periodic waveform) is selected from the clock phases (or periodic waveforms) generated by the delay circuit (e.g. 266, FIG. 3A). Depending on the next clock phase the frequency interpolation circuit 216 may select in the next cycle, the period of the overall waveform has a certain clock period.

In various embodiments, the difference between the current clock phase and the previous clock phase may determine the current clock period. As shown in FIG. 3B, the sampling clock signal may include equally spaced apart clock edges, as represented by the dotted lines (e.g. 330 ilustrated for one clock edge), such that the clock phase or periodic waveform (e.g. 332, 334, 336 illustrated for the waveforms A, B and L respectively) may have a leading edge ([) and a falling edge (]) that correspond to a clock edge 330. As shown in FIG. 3B, the sampling clock signal may have 12 equally spaced apart clock edges 330. As shown in FIG. 3B, there may be 12 evenly spaced clock phases corresponding to the waveforms A 332, B 334, C, D, E, F, G, H, I, J, K and L 336 (waveforms C to K not illustrated in FIG. 3B), which may correspond to the clock phases $\phi_0$-$\phi_{11}$.

Each clock phase $\phi_{i+1}$ (e.g. periodic waveform B 334) leads a clock phase $\phi_i$ (e.g. periodic waveform A 332) by $T_{clk}/12$. The output of the ΔΣM 214 may determine the desired current clock period. By adding the current clock period to the previous clock phase or period, the current clock period could be deduced. As an example, assuming the previous clock phase or periodic waveform is A 332 and the output of the ΔΣM 214 is zero, the clock period is ($T_{clk}+0\times T_{clk}/12$) and therefore the current clock phase remains as A 332. Where the output of the ΔΣM 214 is −1, the clock period is ($T_{clk}-1\times T_{clk}/12$), and therefore the current clock phase is L (=A+11×$T_{clk}/12$) 336. The ΔΣM 214 may have a 2-bit output (e.g. −2, −1, 0 and 1), which corresponds respectively to clock periods of $10T_{clk}/12$, $11T_{clk}/12$, $12T_{clk}/12$ and $13T_{clk}/12$. In this implementation, the ΔΣM 214 may have an average output of between −1 and 0.

As a non-limiting example, as shown in FIG. 3B, if the 1st chosen clock phase is A 332, the next phase may be the clock phase L 336 and every subsequent 11th clock phase may then be selected, e.g. A 332, L 336, K, J, H, G, F, E, D, C, B, and back to A 332 and so on. Therefore, the waveform may have an overall clock period of $^{11}/_{12}\,T_{clk}$. FIG. 3B also shows a merged waveform 338 of the waveforms A 332 and L 336, where the waveform 338 has a clock period of $^{11}/_{12}\,T_{clk}$. In various embodiments, every successive 10th, 11th, 12th or 13th chosen clock phase may correspond to a clock signal having a corresponding period of $^{10}/_{12}\,T_{clk}$, $^{11}/_{12}\,T_{clk}$, $T_{clk}$ or $13/12T_{clk}$ respectively.

For a given input control word, K, the ΔΣ modulator-controlled frequency interpolation circuit 216 may select any of the 10th, 11th, 12th or 13th successive phases randomly to generate an average clock period. Each control word, K, may result in a unique average clock period or frequency. The two frequency tones used in binary FSK transmission may hence be generated using two different control words, e.g. K0 and K1, to represent the '0' and '1' data.

Figure 3C:
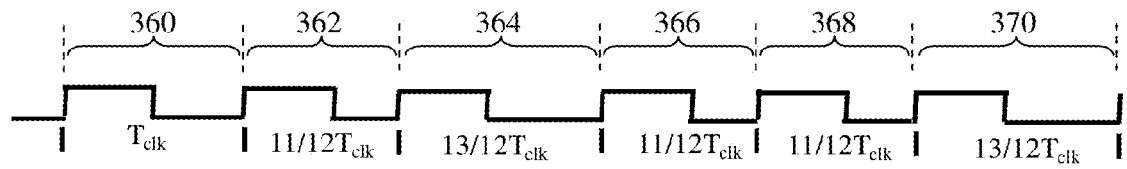

FIG. 3C shows the operation of a frequency interpolation circuit (e.g. 216, FIG. 3A), according to various embodiments, as a further non-limiting example. FIG. 3C shows an output signal or waveform, $\phi_{inj}$, based on the sequence of the selected clock phases or periodic waveforms A 332, L 336, A 332, L 336, K, L 336 of FIG. 3A, having an average clock period (or frequency) after 6 clock cycles of about $0.986T_{clk}$ (average $T_{clk}$=($T_{clk}\,360+^{11}/_{12}\,T_{clk}\,362+13/12T_{clk}\,364+^{11}/_{12}\,T_{clk}\,366+^{11}/_{12}\,T_{clk}\,368+13/12T_{clk}\,370$)/6).

In various embodiments, the ΔΣM (e.g. 214) may be a digital element and may have a 2-bit output, which may be designed to pick every subsequent 10th to 13th clock phases, such that the input control word, K, for the ΔΣM 214 may result in a dithered sequence that results in an average phase selection that is an interpolation between the 11th and 12th successive phases.

Figure 4A:
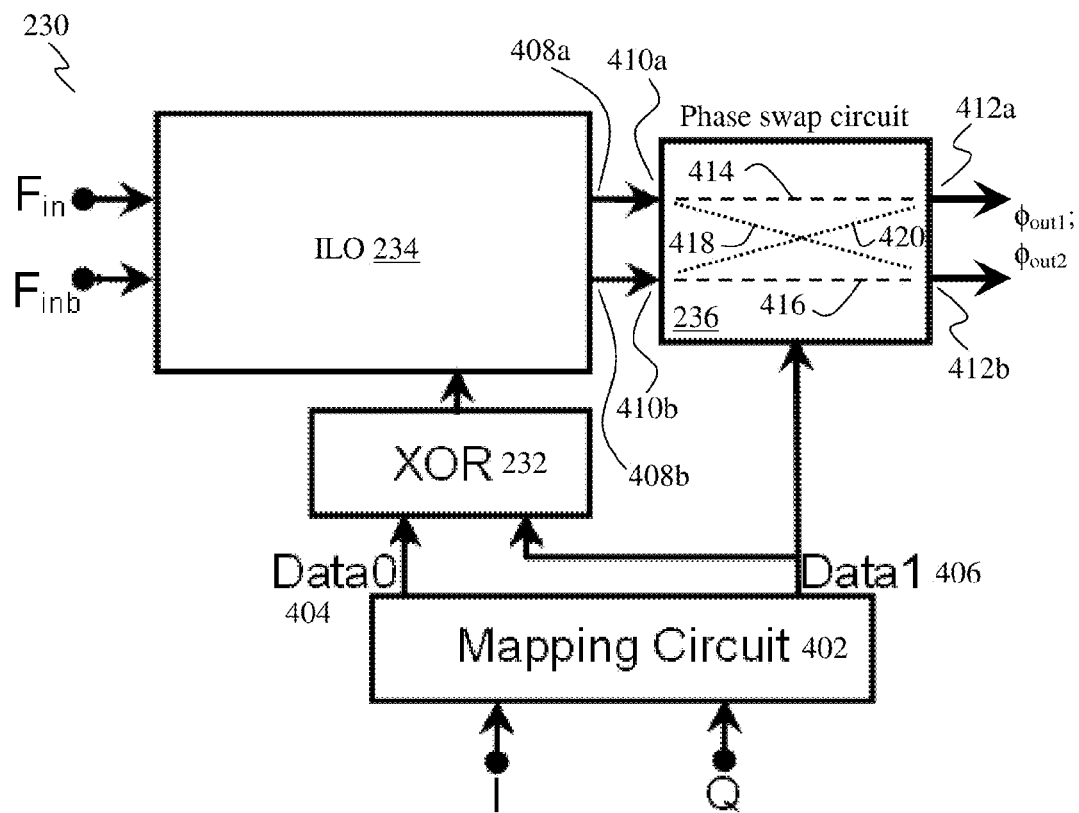
FIG. 4A shows a schematic view of a phase shift keying (PSK) circuit, according to various embodiments.

The operation of the PSK circuit 230 will now be described by way of the following non-limiting example, with reference to FIGS. 4A to 4C. FIG. 4A shows a schematic view of a phase shift keying (PSK) circuit 230 according to various embodiments, which may be employed in the transmitter 200 of FIG. 2. For simplicity and clarity, one or more elements described in the context of transmitter 200 may not be shown in FIG. 4A but nevertheless may be present.

The PSK circuit 230 may include a mapping circuit 402 which may receive input I and Q signals or data, and may perform the desired mapping between input I and Q signals to the control signals Data0 (D0) 404 and Data1 (D1) 406. The PSK circuit 230 may further include a logic element in the form of an "Exclusive OR" (XOR) gate 232 that may receive D0 404 and D1 406 so as to generate an output to be provided to the ILO 234 as a control signal. D1 406 may also be provided to the phase swap circuit 236 to serve as a control signal. Also illustrated in FIG. 4A are out of phase injection signals, $F_{in}$ and $F_{inb}$, that may be inputted to the ILO 234. One or both of the signals, $F_{in}$ and $F_{inb}$, may be equivalent to the signal, $\phi_{int}$, shown in FIG. 2.

The ILO 234 may include a plurality of frequency modulating elements, for example in the form of capacitors, for changing the resonant frequency of the ILO 234. By changing the resonant frequency of the ILO 234, the relationship between the resonant frequency and the frequency of the injected intermediate signal, $\phi_{int}$, may be changed, resulting in changes to the phase of the output signal generated by the ILO 234, thereby allowing phase modulation.

In various embodiments, as a non-limiting example, the ILO 234 may include two capacitor bank arrangements, which may result in two output phases that are 90° apart. Each of the two capacitor bank arrangements may be arranged in a row and coupled in parallel to each other. Each capacitor bank arrangement may include two capacitors arranged in series with each other, and may also include a switch arranged in between the two series capacitors, where the switch may be toggled to activate or switch on the respective capacitor bank arrangement so as to provide an output with the required output phase, for example 45° or −45°. The output signal from the XOR gate 232 may act as a control signal to control switching of the respective capacitor bank arrangement.

The phase swap circuit 236 may be employed to produce two possible output signals whose respective phases may be inverted (e.g. 180° apart) with respect to each other. The phase swap circuit 236 may have two input ports, for example a first input port 410a which may be coupled to a first output port 408a of the ILO 234, and a second input port 410b which may be coupled to a second output port 408b of the ILO 234. The phase swap circuit 236 may also include two output ports, for example a first output port 412a and a second output port 412b.

D1 406 may act as a control signal to control coupling between the input ports 410a, 410b, and the output ports 412a, 412b, to produce different output signals. For example, based on the value (e.g. "0" or "1") of D1 406, respective coupling paths may be established between the first input port 410a and the first output port 412a via the coupling path as represented by the dashed line 414, and between the second input port 410b and the second output port 412b via the coupling path as represented by the dashed line 416, so as to produce a first output signal ($\phi_{out1}$), or respective coupling paths may be established between the first input port 410a and the second output port 412b via the coupling path as represented by the dotted line 418, and between the second input port 410b and the first output port 412a via the coupling path as represented by the dotted line 420, so as to produce a second output signal ($\phi_{out2}$). $\phi_{out1}$ and $\phi_{out2}$ may have a phase difference of 180°.

As a non-limiting example, based on one value of D1 406, an input signal, $\phi_{in1}$, received at the first input port 410a of the phase swap circuit 236 from the first output port 408a of the ILO 234, may be coupled to the first output port 412a, via coupling part 414, to produce $\phi_{out1}$ having the same phase as $\phi_{in1}$, or $\phi_{in1}$ may be coupled to the second output port 412b, via coupling part 418, to produce $\phi_{out2}$ having a phase that is inverted (180°) to the phase of $\phi_{in1}$. Also, based on another value of D1 406, an input signal, $\phi_{in2}$, received at the second input port 410b of the phase swap circuit 236 from the second output port 408b of the ILO 234, may be coupled to the second output port 412b, via coupling part 416, to produce $\phi_{out1}$ having the same phase as $\phi_{in2}$, or $\phi_{in2}$ may be coupled to the first output port 412a, via coupling part 420, to produce $\phi_{out2}$ having a phase that is inverted (180°) to the phase of $\phi_{in2}$. Therefore, the switching that occurs at the phase swap circuit 236 may be used together with the ILO 234 to control the output phase of the PSK circuit 230.

The phase modulation principle of the PSK circuit 230 will now be described with reference to FIG. 4B. FIG. 4B shows plots 430, 440 illustrating the effects of phase modulation through modifying the self resonant frequency of a LC (inductor-capacitor) tank, according to various embodiments, which may be applicable for the ILO 234. Plot 430 shows the relationship between the output amplitude and frequency, while plot 440 shows the relationship between the output phase shift with frequency.

While the output frequency of the ILO 234 may be locked to the harmonic 802 of the injected signal, $\phi_{int}$, the output phase of the ILO 234 may be determined by the difference between the self-resonant frequency of the LC tank (not shown) within the ILO 234 and the harmonic 432 of the injected signal, $\phi_{int}$.

Figure 4B:
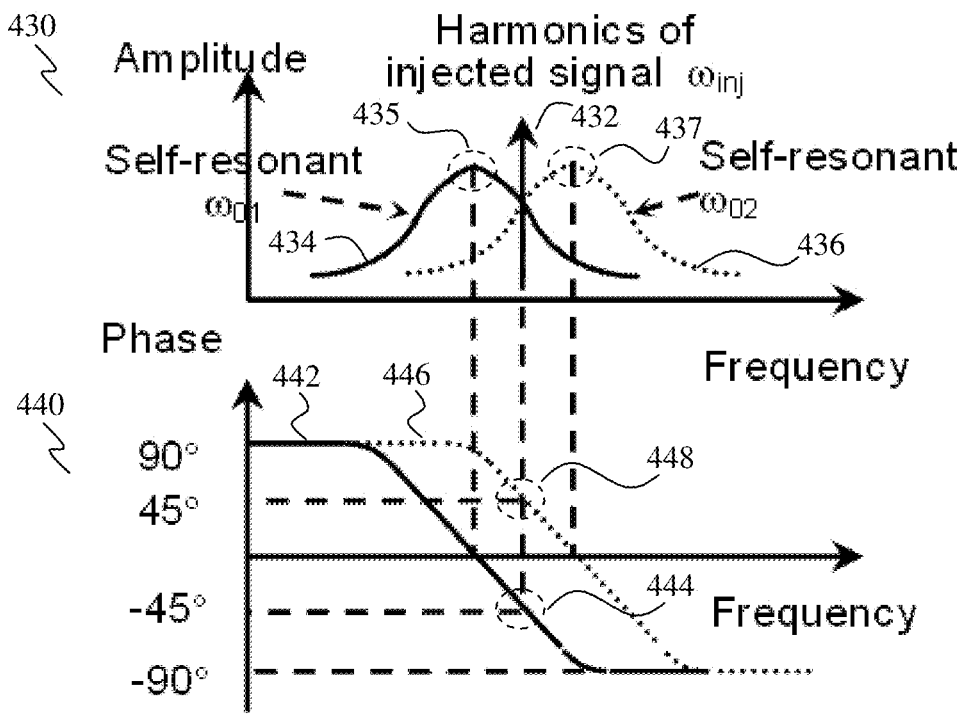
FIG. 4B shows plots illustrating the effects of phase modulation through modifying the self resonant frequency of a LC (inductor-capacitor) tank, according to various embodiments.

As illustrated by the solid line curves (434 and 442) in FIG. 4B, by controlling the self-resonant frequency (denoted by the reference numeral 435) of the LC tank to be lower than the harmonic frequency 432 of $\phi_{int}$ in such a way that the LC tank signal 434 coinciding with the harmonic frequency 432 of $\phi_{int}$ lags behind (denoted using the reference numeral 444) the harmonic 432 of $\phi_{int}$ by 45°, an output signal may exhibit −45° phase shift. On the other hand, as illustrated by the dotted line curves (436 and 446), by making the self-resonant frequency (denoted by the reference numeral 437) higher than the harmonic signal 432 so that the LC tank signal 436 coinciding with the harmonic frequency 432 may be ahead (denoted using the reference numeral 448) of the harmonic signal by 45°, an output signal phase shift becomes +45°. Therefore, by changing the self-resonant frequency (435 and 437) of the LC tank, a phase difference of 90° may be created in an output signal. The self-resonant frequency of an LC tank may be modified through capacitor bank switching, as earlier described.

With reference to FIG. 4A, in order to generate all four phases required for QPSK modulation, the phase swap circuit (or polarity swap circuit) 236 may be employed to introduce a 180° phase shift to the output signal. Hence, the phase swap circuit 236 may be employ to reverse or invert the phase of the carrier signal, so that for the injected intermediate signal $I_{int}$ already with, for example, 45° and −45° phase shift (compared with the original phase of the injected signal $I_{inj}$), an overall phase shift of −135° and 135° (compared with the original phase of the injected signal $I_{inj}$) may be achieved. Therefore, by employing both capacitor banks (which is incorporated inside the ILO 234) and the phase swap circuit 236, +45°, −45°, −135° and +135° phase shifts, for example, for QPSK modulation may be realised.

As a non-limiting example, an operation of the PSK circuit 230 may be implemented based on the parameters listed in Table 1, which may result in different output phases depending on the respective combination of Data0 404 and Data1 406.

TABLE 1

| Data1 | Data0 | Output Phase |
|-------|-------|--------------|
| 1     | 1     | 45°          |
| 1     | 0     | −45°         |
| 0     | 0     | 135°         |
| 0     | 1     | −135°        |

Figure 4C:
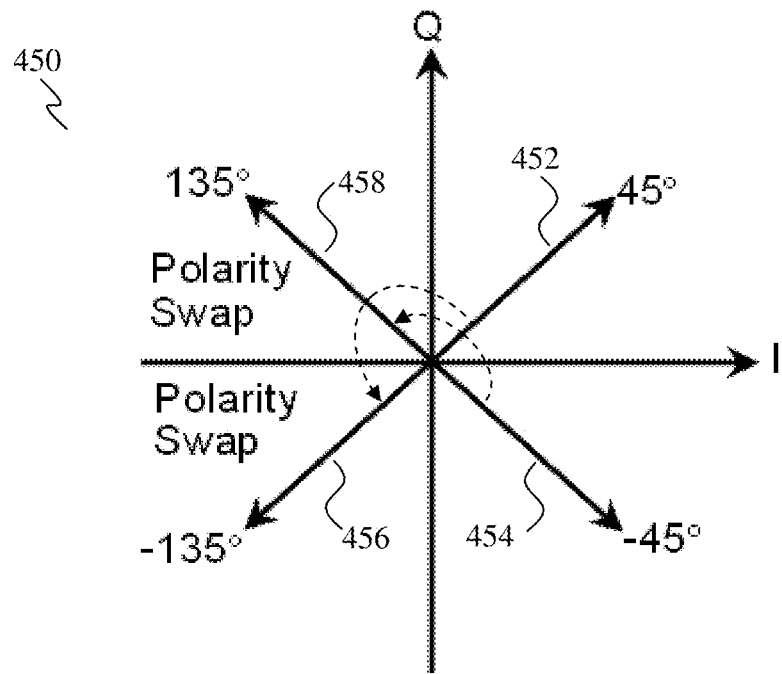
FIG. 4C shows a plot illustrating the phase of an output signal of a phase shift keying (PSK) circuit, according to various embodiments.

FIG. 4C shows a plot 450 illustrating the phase of an output signal of a phase shift keying (PSK) circuit, according to various embodiments. The FSK circuit may generate at least one of an output signal 452 having a phase of 45°, an output signal 454 having a phase of −45°, an output signal 456 having a phase of −135° which may be phase swapped from the signal 452, or an output signal 458 having a phase of 135° which may be phase swapped from the signal 454.

In various embodiments, with reference to FIG. 2, the first stage of the transmitter 200 may include a ΔΣ based FSK circuit 210. The first stage may include or provide a ΔΣ-modulated frequency reference. By applying ΔΣ modulation on a delay-locked loop (DLL) multi-phase reference 252, different output frequencies may be generated by averaging and interpolating between 2 reference clock periods. In order to make the noisy dithered signal useful as a frequency reference, dual injection locking may be employed to reduce the effects of dithering. Two injection locked oscillators may be provided in the transmitter 200 for effective filtering. In order to cut down on the use of inductors, which are costly and occupy a large area, especially in the low frequency regime, instead of using two LC injection locked oscillators, a hybrid FIR technique with an injection-locked relaxation oscillator (ILXO) 220 is adopted in the first stage as a substitute for one of the injection-locked oscillators. Unlike typical digital finite impulse response (FIR) filters, FIR filtering in various embodiments is performed in both the digital and analog domains, where phase selection is done in the digital domain while the selected phases from the MUX array 222 are "summed" using an injection locked relaxation oscillator (ILXO) 220 in the analog domain. This approach is different from conventional FIR embedded techniques, which for example use a multi-bit charge pump as a summer, where the injection locked oscillator 220 in the first stage may provide additional averaging/filtering benefit. Compared with conventional phase-averaging phase interpolators, the relaxation oscillator 220 of various embodiments may not consume additional power for each FIR tap, thus contributing to further power savings.

The second stage of the transmitter 200 may include an LC injection-locked oscillator (ILO) 234 as the other of the two injection locked oscillators described above, which may be used for multiple functions. Besides providing additional filtering at the output, the ILO 234 may also multiply the generated frequency from the first stage up to the desired output frequency through sub-harmonic injection locking. As the output phase of the resultant signal may be determined by the free running frequency of the ILO 234 and the frequency of the injected signal, e.g. $\phi_{inj}$, the output phase may be manipulated by controlling the resonant frequency of the ILO 234. Hence, phase modulation may be made possible by the second stage injection locking.

The FSK/QPSK modes of the transmitter of various embodiments will now be described, with reference to FIGS. 2, 3A and 4A.

In order to use the transmitter 200 as an FSK transmitter for transmission of a FSK modulated signal, the QPSK control data bits, D1 and D0, may be held constant. Frequency selection may be done by changing the control word, K, for the $\Delta\Sigma$ modulator 214. The frequency step may be determined by the resolution of the $\Delta\Sigma$ modulator 214. In various embodiments, the $\Delta\Sigma$ modulation may be used to interpolate between $^{11}/_{12}$ $T_{clk}$ and $T_{clk}$, which may give rise to a generated frequency between about 133.33 MHz and about 145.45 MHz. When the generated signal is injection-locked into the second stage LC ILO 234 via its third harmonic, the output may have a tuning range of between about 400 MHz to about 436.36 MHz.

In QPSK mode, the $\Delta\Sigma$ modulator control word, K, may be fixed to provide a fixed frequency reference, $f_{mod}$. The ILO 234 in the second stage may be calibrated to provide two capacitor bank settings as described above which may give rise to two output phases that are 90° apart when locked to $f_{mod}$. The phase swap circuit 236 may provide additional phases required by QPSK modulation by inverting the output phase. In various embodiments, the QPSK I/Q data, e.g. D0 and D1, may control both the capacitor bank settings of the ILO 234, and the phase swap circuit 236, to generate 4 orthogonal phases for QPSK modulation.

In various embodiments, dual injection locking may be provided to generate an output of reasonable phase noise. Without filtering, the reference frequency used for injection locking may be dithered and phase errors that may result may degrade the error vector magnitude (EVM) measurement of the transmitter 200. A smaller EVM increases the probability of correct data being obtained on the receiver side.

In both modes of operation for the transmitter, the generated signal, being either the FSK modulated signal or the PSK modulated signal, may be relayed to the antenna 292 through the power amplifier (PA) 290 for transmission.

As described above, the transmitter of various embodiments may incorporate a dual FSK/QPSK modulation scheme architecture based on injection locking. In other words, the transmitter may support frequency and phase modulation schemes, and incorporating an injection-locking approach. The transmitter may include an embedded FIR filter with injection lock for dual noise filtering.

Additional LC injection locking may be required to reduce dithering from the 1st stage. In various embodiments, a relaxation oscillator combined with embedded FIR technique is used instead of an LC-ILO to provide effective filtering effect, and saving inductors in the process. In this way, the use of inductors may be minimised or avoided, thus saving cost and chip area needed to accommodate inductors.

By providing direct frequency and phase modulations, the architecture of various embodiments may avoid the pitfalls that come with system complexity like additional baseband processing and modulation gain balancing required for the conventional mixer based architectures and the 2-point modulation PLL solutions. This versatility enables the architecture of various embodiments to support multiple standards.

In addition, the transmitter of various embodiments may offer very high data rates, which may be constrained only by the practical limits of injection lock time and $\Delta\Sigma$ averaging, unlike closed loop systems such as the conventional fractional-N PLL, whose data rate is severely restricted by its loop bandwidth. Despite being an open loop system, the transmitter of various embodiments enjoys relatively good phase noise due to built-in filtering compared with some of the existing open-loop systems which suffer from frequency drifting. Moreover, the transmitter of various embodiments has flexible frequency selection, thus enabling multi-channel support, especially in the congested spectrums, unlike the rigid system in conventional transmitters, for example having the injection locked ring oscillator (RO) with hybrid edge combiner/power amplifier (EC/PA) architecture.

Furthermore, in various embodiments, by employing injection locking, frequency generation may be performed in a lower frequency domain. Coupled with the use of low power relaxation oscillator in the first stage, power consumption may be kept low.

Figure 5:
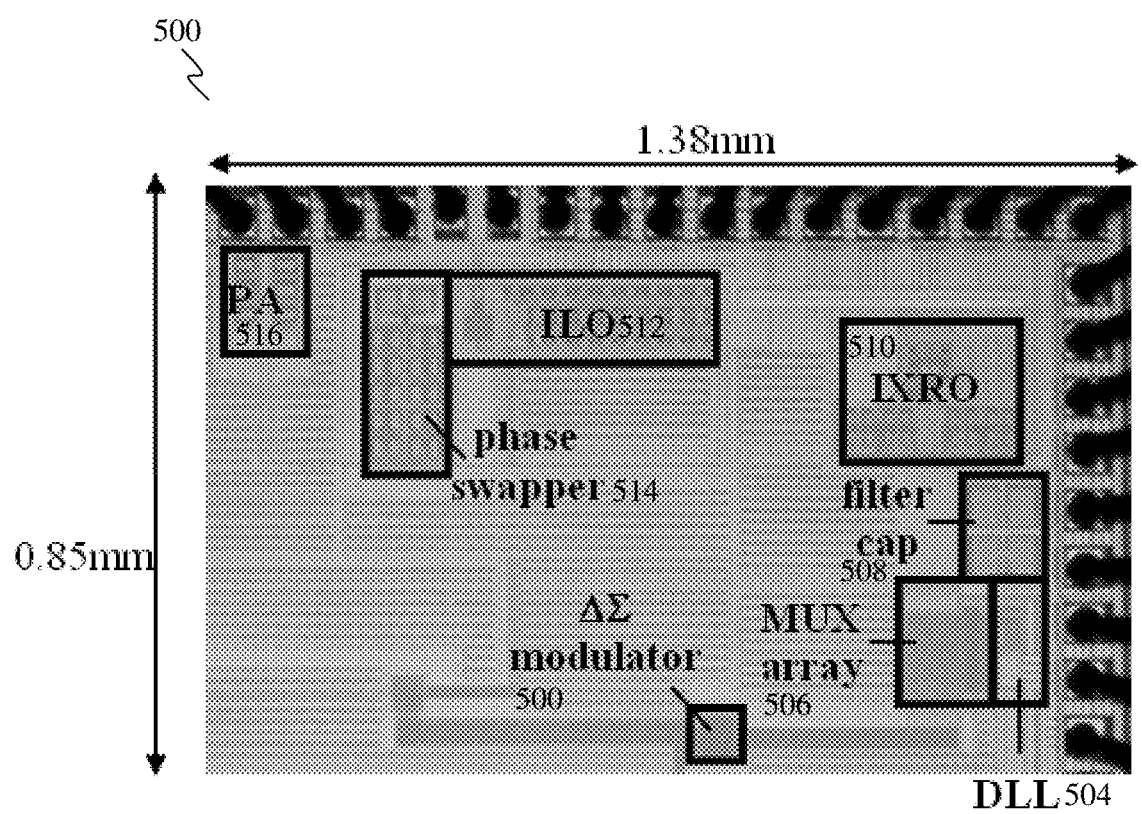
FIG. 5 shows a die photo of a transmitter, according to various embodiments.

The design of the transmitter will now be described by way of the following non-limiting example. The transmitter may be implemented in 65 nm CMOS, where the simulated power consumption is slightly less than about 2 mW. The full system or transmitter architecture may occupy about 0.23 mm² of active area as it does not have any passive inductor on the chip. FIG. 5 shows a die photo 500 of a transmitter, according to various embodiments. As shown in FIG. 5, the transmitter may include a $\Delta\Sigma$ modulator 502, a delay-locked loop (DLL) circuit 504, a multiplexer (MUX) array 506, a filter capacitor arrangement 508, an injection-locked relaxation oscillator (IXRO) 510, an injection-locked LC oscillator (ILO) 512, a phase swap circuit 514, and a power amplifier (PA) 516.

Simulation and measurement results for the transmitter will now be described by way of the following non-limiting examples.

Figure 6A:
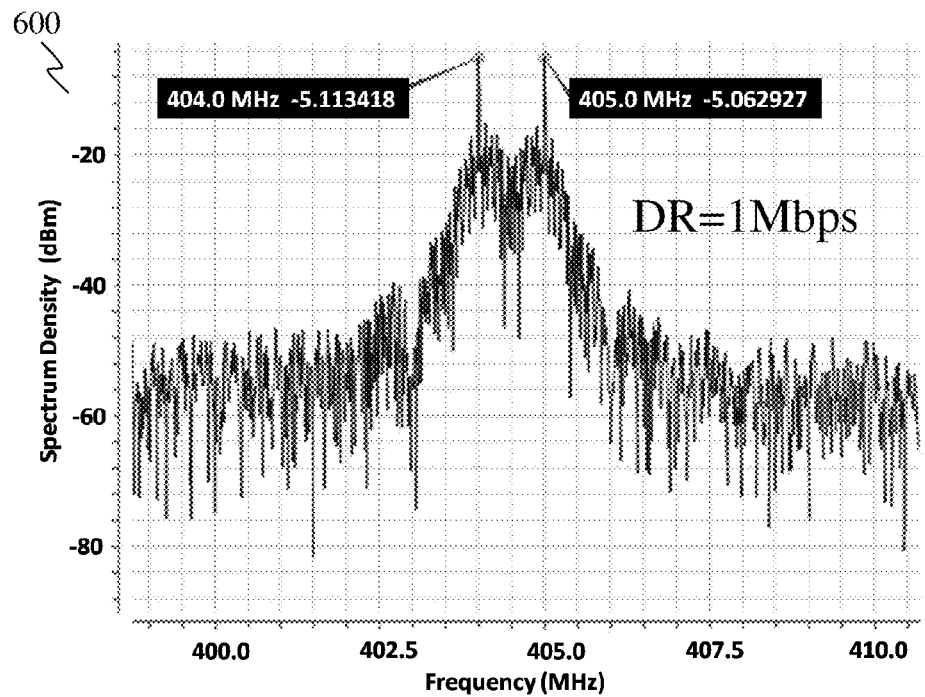
FIG. 6A shows a plot of simulated output spectrum at a power amplifier (PA) of a transmitter of various embodiments, showing FSK mode.
Figure 6B:
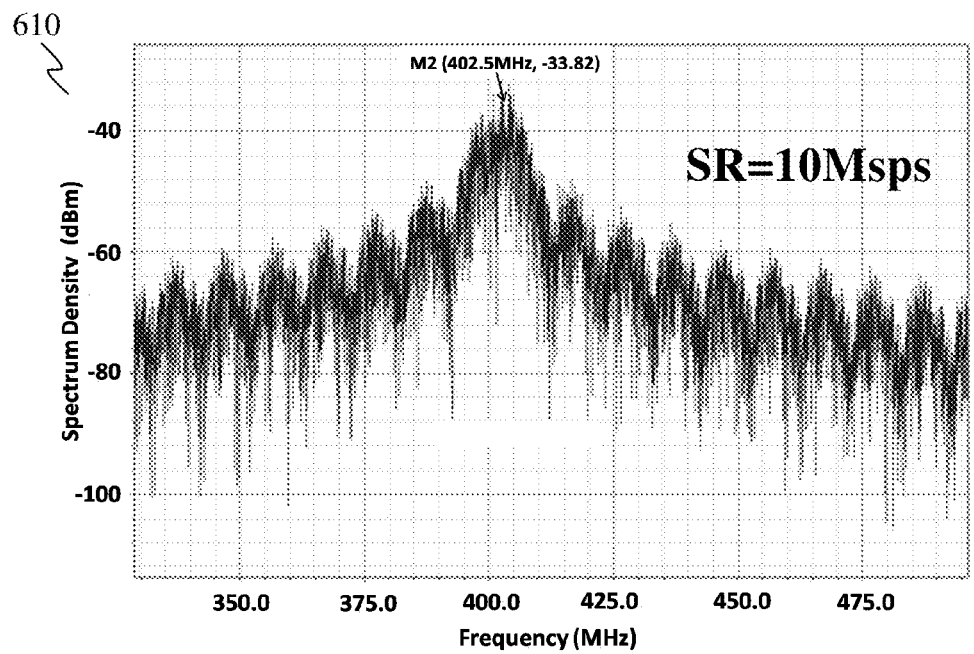
FIG. 6B shows a plot of simulated output spectrum at a power amplifier (PA) of a transmitter of various embodiments, showing QPSK mode.

The output spectra at the power amplifier (PA) of a transmitter of various embodiments for different modes of operation are shown in FIGS. 6A and 6B. FIG. 6A shows a plot 600 of simulated output spectrum at the power amplifier (PA) output, illustrating FSK operation at a data rate (DR) of about 1 Mbps (up to 5 Mbps) with a frequency separation of about 1 MHz, while FIG. 6B shows a plot 610 of simulated output spectrum at the power amplifier (PA) output, depicting QPSK mode of operation at a data rate (DR) of about 20 Mbps or a symbol rate (SR) of about 10 Msps. The center frequencies chosen for the FSK and QPSK modes are about 404.5 MHz and about 402.5 MHz respectively. As may be observed in FIGS. 6A and 6B, multiple modulation schemes may be supported by the transmitter of various embodiments, illustrating FSK and QPSK modulation capabilities.

Figure 6C:
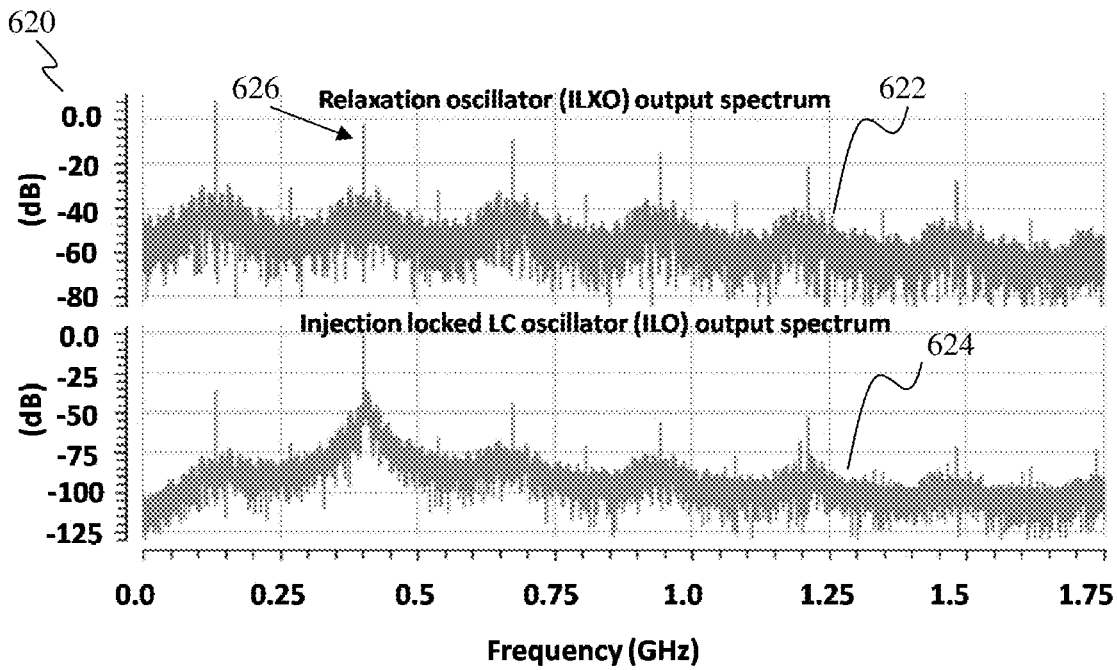
FIG. 6C shows a plot of simulated results illustrating the effects of dual injection locking, according to various embodiments.

FIG. 6C shows a plot 620 of simulated results illustrating the effects of dual injection locking, according to various embodiments, highlighting the need for dual injection locking instead of single injection locking. Plot 620 shows spectrum 622 obtained at the output of the relaxation oscillator (ILXO) with FIR embedded filtering, after the first injection locking, and spectrum 624 obtained at the output of the injection locked oscillator (ILO), after the second injection locking. The results in FIG. 6C clearly shows the suppression of the high frequency noise and the side spurs which may be the results of ΔΣ modulation noise shaping and use of sub-harmonics for injection locking, thus improving short term jitter or phase noise. The arrow 626 indicates the desired frequency.

Figure 6D:
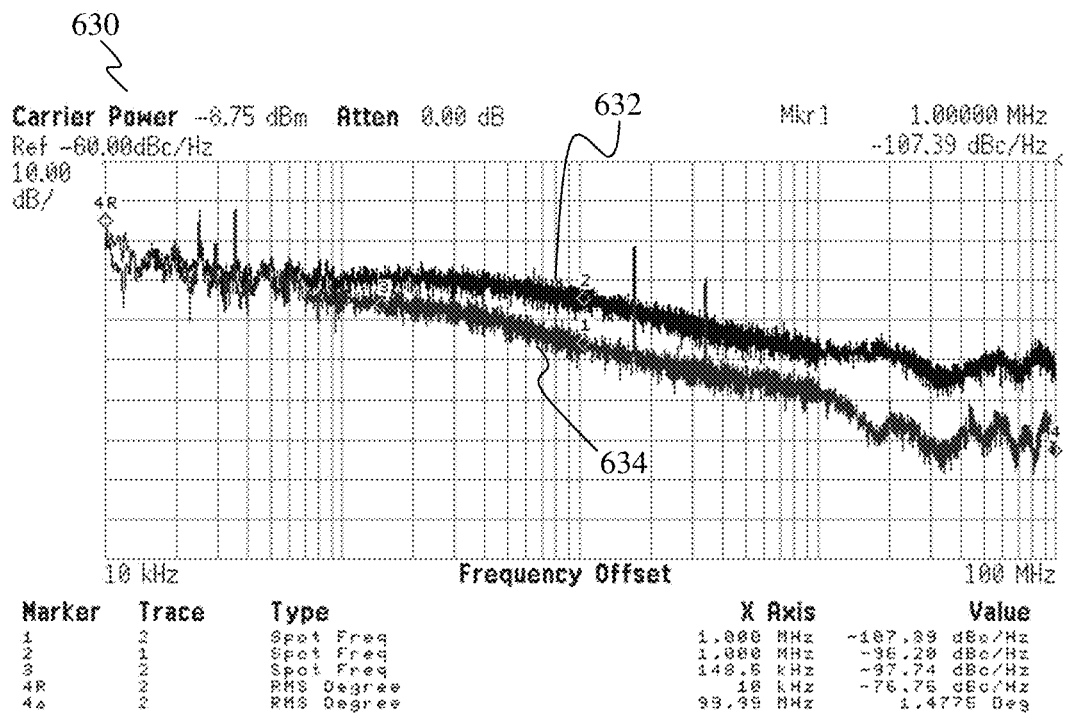
FIG. 6D shows a plot of measured results illustrating the effects of finite impulse response (FIR) embedded filtering, according to various embodiments.

FIG. 6D shows a plot 630 of measured results illustrating the effects of finite impulse response (FIR) embedded filtering, according to various embodiments. Plot 630 shows result 632 for measured phase noise at the output of the relaxation oscillator (ILXO) without FIR embedded filtering, and result 634 for measured phase noise at the output of the relaxation oscillator (ILXO) with FIR embedded filtering. As may be observed, the FIR embedded filtering may also help to contain or suppress the high frequency noise to some extent. However, it may not be as effective as the dual injection locking approach.

As shown in FIGS. 6C and 6D, the overlapped spectra show the benefits of dual injection locking and FIR embedded filtering, which clearly demonstrate high frequency noise suppression.

The architecture of various embodiments may be simple and may consume less power compared to conventional architectures. Various embodiments of the transmitter may be designed for or with one or more of the following parameters: (1) injection locked open loop modulation; (2) data rate of ≥5 Mbps for FSK and >20 Mbps for QPSK; (3) resolution of about 1.024 kHz for FSK; (4) power consumption of about 1.9 mW; (5) power supply, $V_{dd}$, of about 1 V; (5) energy/bit of about 0.095-0.38 nJ/bit; (6) frequency range of about 400-436.36 MHz MICS/ISM/WBAN; (7) phase and frequency modulations supported; (8) transmitter power of about −5 dBm; (9) phase noise of approximately −105 dBc/Hz at 1 M Hz offset (estimated from simulation); (10) process based on 65 nm CMOS; or (11) active area of 0.23 mm².

Various embodiments of the transmitter may be used in low power, multi-channel, narrowband applications with reconfigurable frequency and phase modulation (e.g. WBAN 802.15.6). In addition, the transmitter may be used to support multiple standards which may require different modulation schemes. The transmitter of various embodiments may also be used for wireless communication system, for example in low-power bio-medical applications. The transmitter of various embodiments may also be suitable for portable wireless and/or wearable devices.

It should be appreciated that modifications to the transmitter of various embodiments may be carried out to include amplitude modulation to support additional modulation schemes, for example quadrature amplitude modulation (QAM), etc. In addition, in-band noise reduction may be incorporated.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A transmitter comprising:
a frequency shift keying (FSK) circuit; and
a phase shift keying (PSK) circuit coupled in series to the FSK circuit;
wherein the FSK circuit is configured, in a first mode of operation, to provide a FSK modulated signal to the PSK circuit, and, in a second mode of operation, to provide a fixed frequency signal to the PSK circuit, and
wherein the PSK circuit is configured, in the first mode of operation, to transmit the FSK modulated signal, and, in the second mode of operation, to provide a PSK modulated signal based on the fixed frequency signal received from the FSK circuit,
wherein the FSK circuit comprises:
an oscillator coupled to the PSK circuit, wherein the oscillator is configured for injection-locking of a frequency of the FSK modulated signal or the fixed frequency signal to a frequency of an injection signal to be inputted into the oscillator; and
a finite impulse response (FIR) filter configured to generate the injection signal, the injection signal having a frequency that depends on input signals to the FIR filter.

2. The transmitter as claimed in claim 1, wherein in the first mode of operation, the PSK circuit is further configured to upscale a frequency of the FSK modulated signal.

3. The transmitter as claimed in claim 1, wherein the PSK circuit comprises:
another oscillator coupled in series to the oscillator to receive the FSK modulated signal or the fixed frequency signal, and to produce an output signal,
wherein the other oscillator is configured for injection-locking of a frequency of the output signal to the frequency of the FSK modulated signal or the fixed frequency signal.

4. The transmitter as claimed in claim 3,
wherein, in the first mode of operation, the other oscillator is configured to upscale the frequency of the FSK modulated signal to produce the output signal, and
wherein, in the second mode of operation, the other oscillator is configured to vary its resonant frequency in response to a control signal to produce the output signal, wherein the output signal has a phase determined based on the frequency of the fixed frequency signal and the resonant frequency of the other oscillator, the phase being selected from two possible phases spaced apart by 90°.

5. The transmitter as claimed in claim 4, wherein, in the first mode of operation, the other oscillator is configured to produce the output signal based on a third harmonic of the frequency of the FSK modulated signal.

6. The transmitter as claimed in claim 4, wherein the PSK circuit further comprises:
a phase swap circuit configured to receive the output signal produced by the other oscillator,
wherein, in the first mode of operation, the phase swap circuit is configured to transmit the output signal, and
wherein, in the second mode of operation, the phase swap circuit is configured to produce one output signal out of two possible output signals, wherein an output signal of the two possible output signals has a phase that is the same as a phase of the output signal produced by the other oscillator, and wherein another output signal of the two possible output signals has a phase that is inverted to a phase of the output signal produced by the other oscillator.

7. The transmitter as claimed in claim 1, further comprising:
a clock generator configured to generate a plurality of periodic waveforms delayed from each other by a predetermined interval,
wherein the FIR filter is configured to select one or more periodic waveforms from the plurality of periodic waveforms to generate the injection signal.

8. The transmitter as claimed in claim 7, wherein the FSK circuit further comprises:
a frequency interpolation circuit configured to provide one or more select signals to the FIR filter for selecting the one or more periodic waveforms from the plurality of periodic waveforms.

9. The transmitter as claimed in claim 8, wherein the FSK circuit further comprises:
a sampling circuit configured to provide an input signal to the frequency interpolation circuit, the sampling circuit adapted to receive a data signal,
wherein the frequency interpolation circuit is configured to provide the one or more select signals to the FIR filter based on the input signal,
wherein, in the first mode of operation, the data signal is varied, and wherein the sampling circuit is configured to be controlled by the varied data signal to control the frequency interpolation circuit to provide the one or more select signals to the FIR filter to select the one or more periodic waveforms during respective sampling cycles, for the FSK circuit to produce the FSK modulated signal; and
wherein, in the second mode of operation, the data signal is fixed, and wherein the sampling circuit is configured to be controlled by the fixed data signal to control the frequency interpolation circuit to provide the one or more select signals to the FIR filter to select the one or more periodic waveforms during respective sampling cycles, for the FSK circuit to produce the fixed frequency signal.

10. The transmitter as claimed in claim 9, wherein, in the first mode of operation and the second mode of operation, the sampling circuit is configured to be controlled by the data signal to have the FIR filter select two periodic waveforms.

11. The transmitter as claimed in claim 8, wherein the FIR filter comprises:
a register arrangement configured to receive the one or more select signals; and
a plurality of multiplexers coupled to the register arrangement,
wherein a respective multiplexer of the plurality of multiplexers is configured to receive a respective periodic waveform of the plurality of periodic waveforms, and
wherein the register arrangement is configured to select one or more multiplexers of the plurality of multiplexers in response to the one or more select signals to select the one or more periodic waveforms for generating the injection signal.

12. The transmitter as claimed in claim 7, wherein the clock generator comprises:
a delay circuit configured to generate the plurality of periodic waveforms based on a reference clock signal.

13. The transmitter as claimed in claim 12, wherein the clock generator further comprises:
a crystal oscillator configured to provide the reference clock signal.

14. The transmitter as claimed in claim 7, wherein the injection signal has a frequency that is at least substantially equal to an average frequency of the selected periodic waveforms.

15. The transmitter as claimed in claim 1, further comprising an amplifier configured, in the first mode of operation, to amplify the FSK modulated signal prior to transmission by the transmitter, and, in the second mode of operation, to amplify the PSK modulated signal prior to transmission by the transmitter.

16. The transmitter as claimed in claim 1, further comprising an antenna for transmission of the FSK modulated signal in the first mode of operation, and the transmission of the PSK modulated signal in the second mode of operation.

17. A transmitter comprising:
a frequency shift keying (FSK) circuit; and
a phase shift keying (PSK) circuit coupled in series to the FSK circuit;
wherein the FSK circuit is configured, in a first mode of operation, to provide a FSK modulated signal to the PSK circuit, and, in a second mode of operation, to provide a fixed frequency signal to the PSK circuit, and
wherein the PSK circuit is configured, in the first mode of operation, to transmit the FSK modulated signal, and, in the second mode of operation, to provide a PSK modulated signal based on the fixed frequency signal received from the FSK circuit,
wherein the FSK circuit comprises an oscillator coupled to the PSK circuit, wherein the oscillator is configured for injection-locking of a frequency of the FSK modulated signal or the fixed frequency signal to a frequency of an injection signal to be inputted into the oscillator,
wherein the PSK circuit comprises another oscillator coupled in series to the oscillator to receive the FSK modulated signal or the fixed frequency signal, and to produce an output signal, wherein the other oscillator is configured for injection-locking of a frequency of the output signal to the frequency of the FSK modulated signal or the fixed frequency signal,
wherein, in the first mode of operation, the other oscillator is configured to upscale the frequency of the FSK modulated signal to produce the output signal, and
wherein, in the second mode of operation, the other oscillator is configured to vary its resonant frequency in response to a control signal to produce the output signal, wherein the output signal has a phase determined based on the frequency of the fixed frequency signal and the resonant frequency of the other oscillator, the phase being selected from two possible phases spaced apart by 90°.

18. The transmitter as claimed in claim 17, wherein, in the first mode of operation, the other oscillator is configured to produce the output signal based on a third harmonic of the frequency of the FSK modulated signal.

19. The transmitter as claimed in claim 17, wherein the PSK circuit further comprises:
a phase swap circuit configured to receive the output signal produced by the other oscillator,
wherein, in the first mode of operation, the phase swap circuit is configured to transmit the output signal, and
wherein, in the second mode of operation, the phase swap circuit is configured to produce one output signal out of two possible output signals, wherein an output signal of the two possible output signals has a phase that is the same as a phase of the output signal produced by the other oscillator, and wherein another output signal of the two possible output signals has a phase that is inverted to a phase of the output signal produced by the other oscillator.

* * * * *